United States Patent
Ando et al.

(10) Patent No.: US 12,553,156 B2
(45) Date of Patent: Feb. 17, 2026

(54) STRAND PRODUCTION METHOD, STRAND PRODUCTION APPARATUS, AND FIBER REINFORCED RESIN STRAND

(71) Applicant: KOBE STEEL, LTD., Hyogo (JP)

(72) Inventors: Taka Ando, Hyogo (JP); Makoto Takenaka, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 131 days.

(21) Appl. No.: 18/051,931

(22) Filed: Nov. 2, 2022

(65) Prior Publication Data

US 2023/0287605 A1    Sep. 14, 2023

(30) Foreign Application Priority Data

Nov. 5, 2021  (JP) .................. 2021-181095

(51) Int. Cl.
  *D02G 3/40*   (2006.01)
  *D01H 1/00*   (2006.01)
  *D02G 3/02*   (2006.01)

(52) U.S. Cl.
  CPC ................. *D02G 3/40* (2013.01); *D02G 3/02* (2013.01); *D01H 1/00* (2013.01); *D02G 3/404* (2013.01)

(58) Field of Classification Search
  CPC ............ D02G 3/40; D02G 3/02; D02G 3/404; D01H 1/00; D01H 1/003; D01H 1/006
  USPC ........................................................... 57/59
  See application file for complete search history.

(56) References Cited

U.S. PATENT DOCUMENTS

| 99,654 | A | * | 2/1870 | DeGuinon | D02G 3/08 57/31 |
| 275,743 | A | * | 4/1883 | Zellers | B32B 37/12 57/361 |
| 1,106,899 | A | * | 8/1914 | Sta[les | D07B 3/08 57/66.5 |
| 2,943,377 | A | * | 7/1960 | Freiberger | D02G 1/00 28/279 |
| 2,944,379 | A | * | 7/1960 | Davis | D02G 3/08 57/310 |
| 3,154,908 | A | * | 11/1964 | Cilker | B29C 63/24 57/2.5 |

(Continued)

FOREIGN PATENT DOCUMENTS

| JP | S51-099149 A | 9/1976 |
| JP | H05-169445 A | 7/1993 |

(Continued)

*Primary Examiner* — Bao-Thieu L Nguyen
(74) *Attorney, Agent, or Firm* — Studebaker Brackett PLLC

(57) ABSTRACT

A strand production apparatus configured to produce a fiber reinforced resin strand having one or a plurality of fiber bundles including reinforcing fibers includes a twisting unit, a resin bath unit, and a winding unit. The twisting unit rotates the one or the plurality of fiber bundles around an axis of the one or the plurality of fiber bundles to form one or a plurality of twisted fiber bundles. In the resin bath unit, the one or the plurality of twisted fiber bundles are impregnated with a molten resin to form a fiber reinforced resin strand. The winding unit winds the fiber reinforced resin strand. The twisting unit is disposed on an upstream side of the resin bath unit in a conveying direction of the one or the plurality of fiber bundles.

4 Claims, 9 Drawing Sheets

(56) References Cited

U.S. PATENT DOCUMENTS

| | | | | |
|---|---|---|---|---|
| 3,327,462 | A * | 6/1967 | Kirk | D02G 1/028 |
| | | | | 57/285 |
| 3,360,919 | A * | 1/1968 | Burr | D07B 3/045 |
| | | | | 57/59 |
| 3,791,132 | A * | 2/1974 | Schutz | D02G 3/40 |
| | | | | 57/313 |
| 3,938,313 | A * | 2/1976 | Marzocchi | B60C 9/0028 |
| | | | | 57/902 |
| 4,050,230 | A | 9/1977 | Senoo et al. | |
| 4,120,139 | A * | 10/1978 | Terasawa | D07B 7/14 |
| | | | | 57/352 |
| 4,709,542 | A * | 12/1987 | Krafft | D07B 3/045 |
| | | | | 57/17 |
| 4,896,495 | A * | 1/1990 | Sperling | D07B 7/06 |
| | | | | 57/127.5 |
| 7,617,667 | B2 * | 11/2009 | Jerome, Jr. | D02G 3/36 |
| | | | | 57/232 |
| 2013/0276421 | A1 * | 10/2013 | Miura | B29B 15/125 |
| | | | | 57/234 |
| 2016/0151984 | A1 | 6/2016 | Miyao et al. | |
| 2018/0320312 | A1 | 11/2018 | Wenzel et al. | |
| 2019/0118495 | A1 | 4/2019 | Miyao et al. | |

FOREIGN PATENT DOCUMENTS

| | | |
|---|---|---|
| JP | 2008-030443 A | 2/2008 |
| JP | 2015-016665 A | 1/2015 |
| JP | 2018-520271 A | 7/2018 |

\* cited by examiner

STRAND PRODUCTION METHOD, STRAND PRODUCTION APPARATUS, AND FIBER REINFORCED RESIN STRAND

CROSS-REFERENCE TO RELATED APPLICATIONS

This application is based on and claims priority under 35 USC 119 from Japanese Patent Application No. 2021-181095 filed on Nov. 5, 2021.

BACKGROUND OF INVENTION

Technical Field

The present disclosure relates to a strand production method, a strand production apparatus, and a fiber reinforced resin strand.

Background Art

Fiber reinforced thermoplastic resin (FRTP) are lightweight and have excellent strength, and among them, a long fiber reinforced thermoplastic resin (LFRTP) containing a long reinforcing fiber has excellent impact resistance and rigidity. An apparatus for producing a fiber reinforced resin strand using such a long fiber reinforced thermoplastic resin is common (see, for example, Patent Literature 1).

Patent Literature 1 discloses a fiber reinforced resin strand production method including impregnating, with a molten resin, a fiber reinforced resin strand including a long reinforcing fiber bundle impregnated with a resin material (hereinafter, referred to as a "strand"), and rotating the strand around an axis thereof by a twisting machine to form a twisted reinforcing fiber bundle. In a production apparatus in Patent Literature 1 (see FIG. 1 and FIG. 2), as shown in FIG. 9, a molten resin material 71 is continuously supplied to a crosshead 75 by an extruder 73, and reinforcing fibers 77 are supplied to the crosshead 75 to impregnate the crosshead 75 with the molten resin material 71. Then, the reinforcing fibers 77 impregnated with the molten resin material 71 are allowed to pass through a die 79 and then cooled and hardened by a cooler 81 to obtain a strand 83. A twist is imparted to the strand 83 between the cooler 81 and a spreader 87 in the crosshead 75 by rotation drive of a pair of twist rollers 85a and 85b.

In addition, in a mechanism shown in FIG. 10, the strand 83 is wound around a rotating winding reel 88, and the winding reel 88 is connected to a rotation shaft 91 via an arm portion 89. Of guide rollers 93a and 93b that assist the movement of the strand 83 in a longitudinal direction, the strand 83 is rotated about an axis to impart a twist thereto on a downstream side of the guide roller 93a being an upstream side.
Patent Literature 1: JP H05-169445A

SUMMARY OF INVENTION

However, in the case of producing the strand 83 by the mechanism shown in FIG. 9, a rotational motion about the rotation shaft in an axial direction is generated in the strand 83 drawn out through the twist rollers 85a and 85b. Therefore, w % ben the strand 83 is simply wound around the winding reel, the kinking of the strand 83 accumulates between the winding reel and the twist rollers 85a and 85b, and finally, the strand 83 may be broken. Therefore, in this mechanism, it is difficult to recover the strand 83 by a normal winding method.

In addition, in the case of producing the strand 83 by the mechanism shown in FIG. 10, the strand 83 is wound around the winding reel 88 while a twist is imparted to the strand 83 by the rotation of the arm portion 89 that supports the winding reel 88. However, the strand 83 drawn from the cooler 81 has less flexibility than the raw material reinforcing fiber, and is easily broken by bending. Therefore, particularly in the case of producing the strand 83 having a small diameter, it is difficult to wind the strand 83 via the guide rollers 93a and 93b and it is difficult to improve a conveying speed (linear speed) of the strand 83.

Further, in a case where the above two mechanisms are combined and a mechanism for absorbing the kinking of the strand 83 after passing through the twist rollers 85a and 85b by the winding reel 88 is adopted, the winding mechanism becomes large, and accordingly, a decrease in productivity is inevitable.

Therefore, the present disclosure provides a strand production apparatus, a strand production method, and a fiber reinforced resin strand, which can prevent the breakage of the strand in a wide linear speed range and contribute to the improvement in productivity without causing kinking during the production of a fiber reinforced resin strand and without making a winding mechanism large and complicated.

The present disclosure includes the followings.
(1) A strand production apparatus configured to produce a fiber reinforced resin strand having one or a plurality of fiber bundles including reinforcing fibers, the strand production apparatus comprising:
a twisting unit that rotates the one or the plurality of fiber bundles around an axis of the one or the plurality of fiber bundles to form one or a plurality of twisted fiber bundles:
a resin bath unit in which the one or the plurality of twisted fiber bundles are impregnated with a molten resin to form a fiber reinforced resin strand; and
a winding unit that winds the fiber reinforced resin strand,
wherein the twisting unit is disposed on an upstream side of the resin bath unit in a conveying direction of the one or the plurality of fiber bundles.
(2) A strand production method for producing a fiber reinforced resin strand having one or a plurality of fiber bundles including reinforcing fibers, the strand production method comprising:
rotating the one or the plurality of fiber bundles around an axis of the one or the plurality of fiber bundles to form one or a plurality of twisted fiber bundles:
impregnating the one or the plurality of twisted fiber bundles with a molten resin to form a fiber reinforced resin strand; and
winding the fiber reinforced resin strand.
(3) A fiber reinforced resin strand comprising one or a plurality of fiber bundles containing reinforcing fibers impregnated with a molten resin,
wherein the one or the plurality of fiber bundles includes a twisted reinforcing fiber, and an amount of the twisted reinforcing fiber in a position closer to a center of the one or the plurality of fiber bundles is larger than that in a position closer to an outer surface of the one or the plurality of fiber bundles.

According to the present disclosure, it is possible to prevent the breakage of the strand in a wide linear speed range and contribute to the improvement in productivity without causing kinking during the production of a fiber reinforced resin strand and without making a winding mechanism large and complicated.

DESCRIPTION OF EMBODIMENTS

Hereinafter, an embodiment of the present disclosure is described in detail with reference to the drawings.
<Fiber Reinforced Resin Strand>

First, a fiber reinforced resin strand produced by a strand production apparatus in the present embodiment is described.

Figure 1:
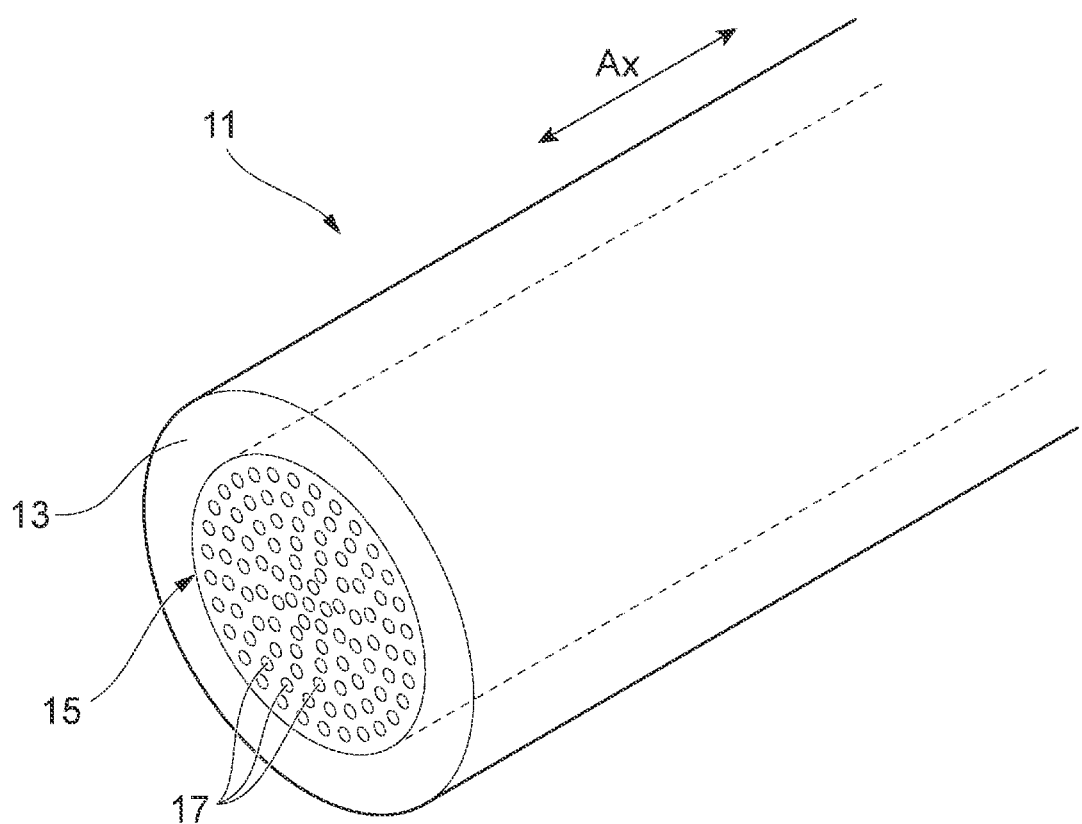
FIG. 1 is a schematic perspective view of a fiber reinforced resin strand.

FIG. 1 is a schematic perspective view of a fiber reinforced resin strand 11.

The strand 11 is a continuous linear resin material containing reinforcing fibers, which is used as an additive manufacturing raw material for a 3D printer and the like. The strand 11 contains a base material 13 containing a thermoplastic resin and one (or a plurality of) fiber bundle 15 impregnated in the base material 13 and continuously extending in an axial direction Ax. The fiber bundle 15 is made by twisting and bundling a large number of reinforcing fibers 17 with each other, and is disposed at a center of the strand 11. The reinforcing fibers 17 of the fiber bundle 15 are impregnated with a molten resin.

The fiber bundle 15 contains twisted reinforcing fibers 17, and an amount of the twisted reinforcing fibers 17 in a position closer to a center of the fiber bundle 15 is larger than that in a position closer to an outer surface of the fiber bundle 15, and the fiber density becomes higher toward the center of the fiber bundle 15. An outer peripheral surface of the base material 13 in the strand 11 is smooth, and a twist groove is not formed in the base material 13 by a twisting operation described later.

Examples of a 3D printer using the above strand 11 as an additive manufacturing raw material include a so-called fused deposition modeling manufacturing apparatus that heats the strand 11 to melt the thermoplastic resin component and stacks the thermoplastic resin component little by little to form a three-dimensional object. The 3D printer using the strand 11 is not limited to the fused deposition modeling, and may be another method. Further, the above strand 11 may be cut into pellets, and the pellets may be used for injection molding.

As the reinforcing fibers 17 of the fiber bundle 15 constituting the strand 11, organic fibers such as a polyethylene fiber, an aramid fiber, and a zylon fiber, and inorganic fibers such as a boron fiber, a glass fiber, a carbon fiber, a metal fiber, and a rock fiber can be used. As the reinforcing fiber, a fiber that has been subjected to a surface treatment can be used in order to improve the adhesion strength between the resin and the fiber.

As the thermoplastic resin contained in the base material 13, polyolefin-based resins such as polypropylene or polyethylene, acrylonitrile-butadiene-styrene resins, polystyrene resins, polyester-based resins such as polyethylene terephthalate, polybutylene terephthalate, or polylactic acid, polyamide-based resins, aromatic polyamide-based resins, polyetherimide, polyarylimide, polyarylate, polyether ether ketone, polyaryletherketone, polybenzimidazole, polyethersulfone, polysulfone, polyvinylidene fluoride resins, liquid crystal polymers, polycarbonate resins, polyacetal, polyphenylene sulfide and the like can be used.

These thermoplastic resins may be used alone, and a thermoplastic resin in which a plurality of these resins is blended may be used in order to improve heat resistance, heat distortion temperature, heat aging resistance, tensile characteristics, bending characteristics, creep characteristics, compression characteristics, fatigue characteristics, impact characteristics, and sliding characteristics of the thermoplastic resin part. Examples of the thermoplastic resin include polyether ether ketone resin (PEEK)/polytetrafluoroethylene (PTFE), and PEEK/polybenzimidazole (PBI). In addition, the thermoplastic resin may be a resin obtained by adding short fibers such as carbon fibers and glass fibers, or talc to the resin.

Phenolic antioxidants, thioether-based antioxidants, or phosphite-based antioxidants, benzotriazole-based ultraviolet absorbers or triazine-based ultraviolet absorbers, hydrazide-based metal deactivating agents or amide-based metal deactivating agents, or the like may be added to the thermoplastic resin to improve the durability of the manufactured object.

In a case where a phthalic acid-based plasticizer or polyester-based plasticizer is added to the thermoplastic resin, the flexibility is improved, and the manufacturing accuracy for manufacturing and the flexibility of the manufactured object can be improved.

In a case where a halogen-based flame retardant, phosphoric acid ester-based flame retardant, inorganic flame retardant, or intumescent flame retardant is added to the thermoplastic resin, the flame retardancy of the manufactured object can be improved.

In a case where a phosphoric acid ester metal salt-based core material or sorbitol-based core material is added to the thermoplastic resin, the thermal expansion during the manufacturing can be controlled and the manufacturing accuracy can be improved.

In a case where a non-ionic-based permanent antistatic agent, anionic-based permanent antistatic agent, and cationic-based permanent antistatic agent is added to the thermoplastic resin, the antistatic property of the manufactured object can be improved.

In a case where a hydrocarbon-based lubricant or metal soap-based lubricant is added to the thermoplastic resin to improve the lubricity of the continuous fiber reinforced strand, the strand can be smoothly supplied during the manufacturing.

<Strand Production Apparatus>

Next, a strand production apparatus for producing the above strand 11 is described.

Figure 2:
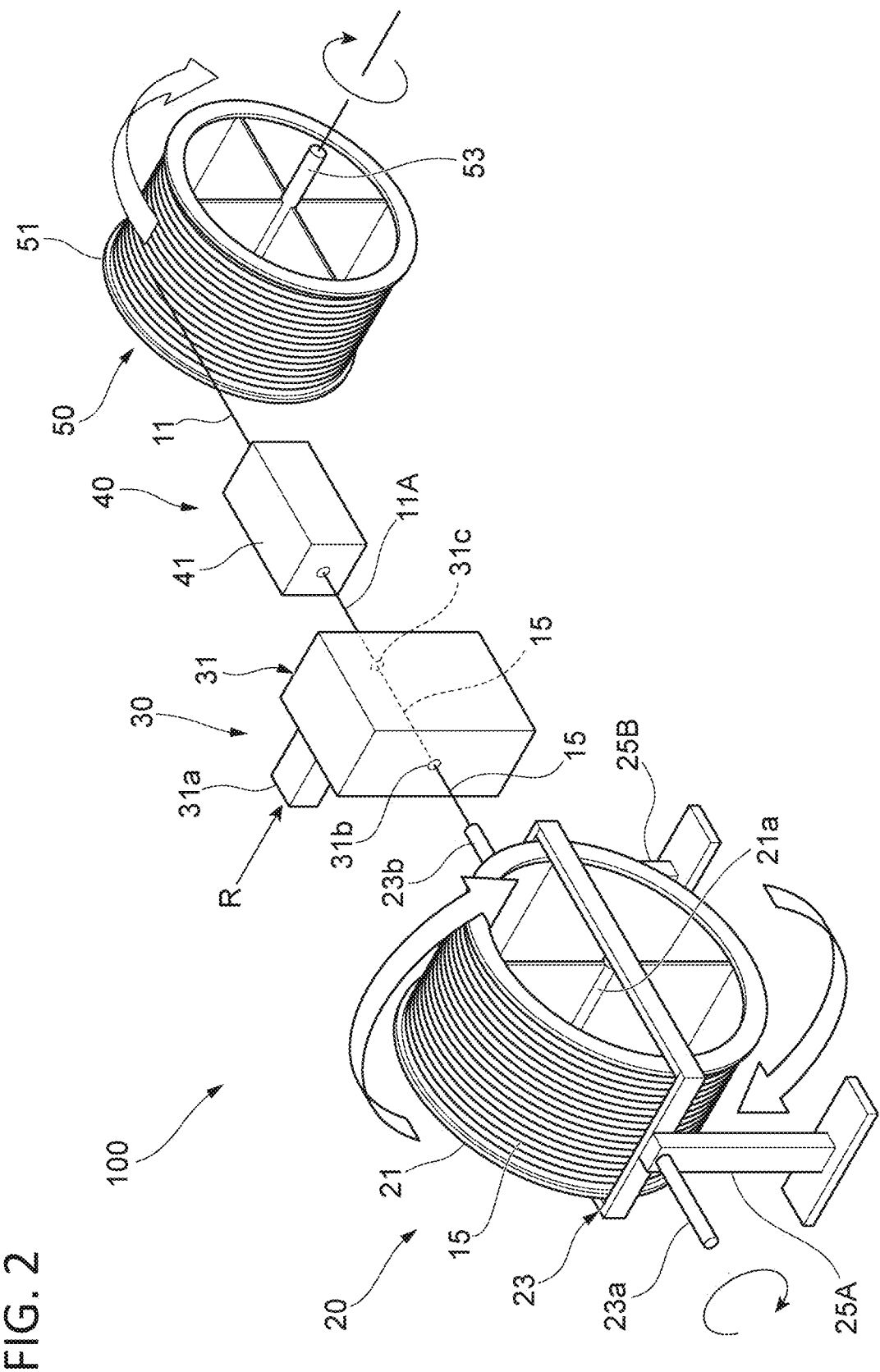
FIG. 2 is a schematic configuration diagram of a strand production apparatus.

FIG. 2 is a schematic configuration diagram of a strand production apparatus 100.

The strand production apparatus 100 includes a twisting unit 20, a resin bath unit 30, a cooling unit 40, and a winding unit 50.

(Twisting Unit)

The twisting unit 20 includes a reel 21 around which the continuous fiber bundle 15 is wound, a reel support 23 that supports a reel rotation shaft 21a and includes a pair of support shafts 23a and 23b intersecting the reel rotation shaft 21a, and a pair of support-shaft supports 25A and 25B that rotatably support the pair of support shafts 23a and 23b, respectively. In the reel support 23 having this configuration, the reel rotation shaft 21a is supported at a center of each of facing sides of the rectangular frame. The support shafts 23a and 23b orthogonal to the reel rotation shaft 21a are provided at centers of the other facing sides so as to project to the outside of the frame. The support shaft 23b is pipe-shaped, and the fiber bundle 15 wound around the reel 21 is drawn out through a through-hole of the pipe-shaped support shaft 23b.

Figure 3A:
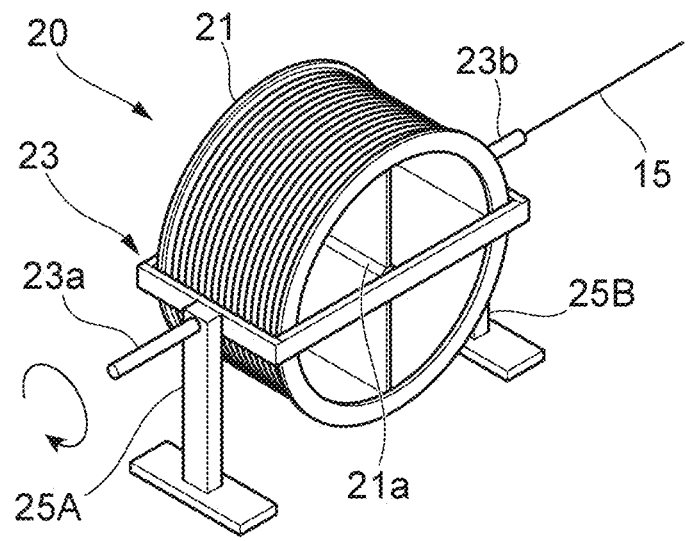
FIG. 3A is a diagram illustrating stepwise a twisting operation for a fiber bundle by a twisting unit.
Figure 3B:
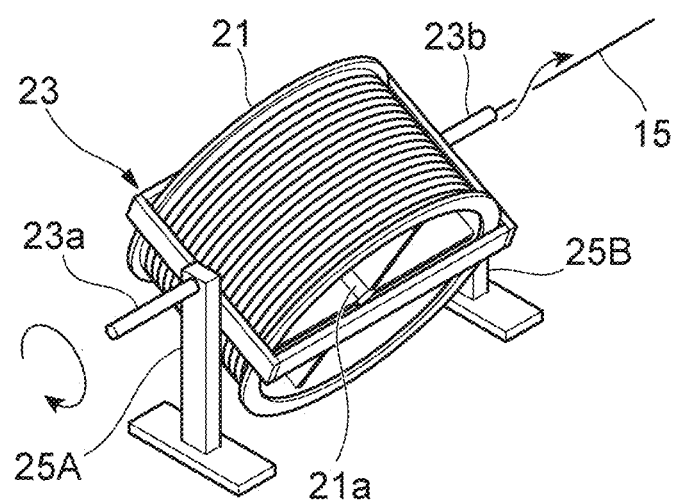
FIG. 3B is a diagram illustrating stepwise a twisting operation for the fiber bundle by the twisting unit.
Figure 3C:
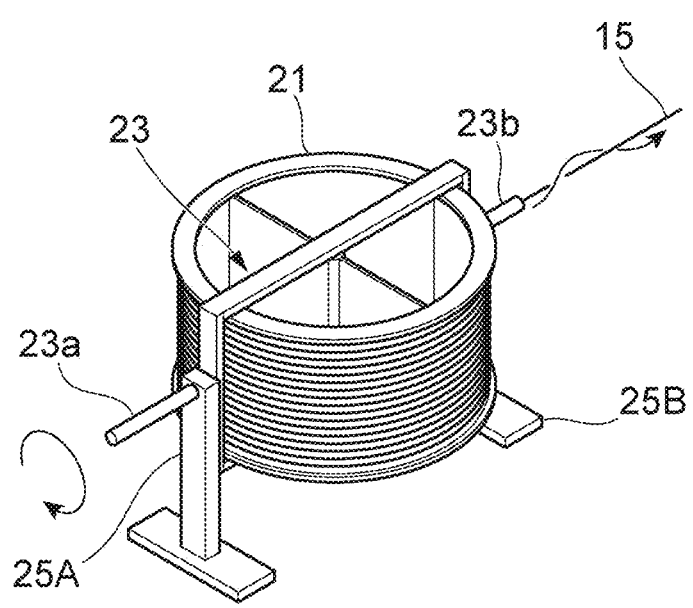
FIG. 3C is a diagram illustrating stepwise a twisting operation for the fiber bundle by the twisting unit.

FIG. 3A to FIG. 3C are diagrams illustrating stepwise a twisting operation for the fiber bundle 15 by the twisting unit 20.

As shown in FIG. 3A, the reel 21 is rotatably supported by the reel support 23 with the reel rotation shaft 21a. When the strand 11 is conveyed by the winding unit 50 shown in FIG. 2, the fiber bundle 15 is drawn out from the reel 21 and the reel 21 rotates. Accordingly, the fiber bundle 15 is sent out from the support shaft 23b.

Then, as shown in FIG. 3B and FIG. 3C, the reel support 23 is rotated around the support shafts 23a and 23b, whereby the reel 21 is tilted, and a twist is imparted to the fiber bundle 15 sent out from the support shaft 23b.

(Resin Bath Unit)

As shown in FIG. 2, the resin bath unit 30 includes a tubular resin bathtub 31 in which a molten thermoplastic resin is stored. The resin bathtub 31 is provided with a resin supply port 31a, a fiber bundle inlet 31b, and a fiber bundle outlet 31c. A kneading extruder (not shown) that melts a raw material of a thermoplastic resin R and extrudes the molten resin into the resin bathtub 31 is connected to the resin supply port 31a. The fiber bundle 15 sent from the twisting unit 20 is introduced into the resin bathtub 31 through the fiber bundle inlet 31b. The fiber bundle 15 introduced into the resin bathtub 31 is immersed in the molten thermoplastic resin, and the inside of the fiber bundle 15 is impregnated with the thermoplastic resin.

Figure 4:
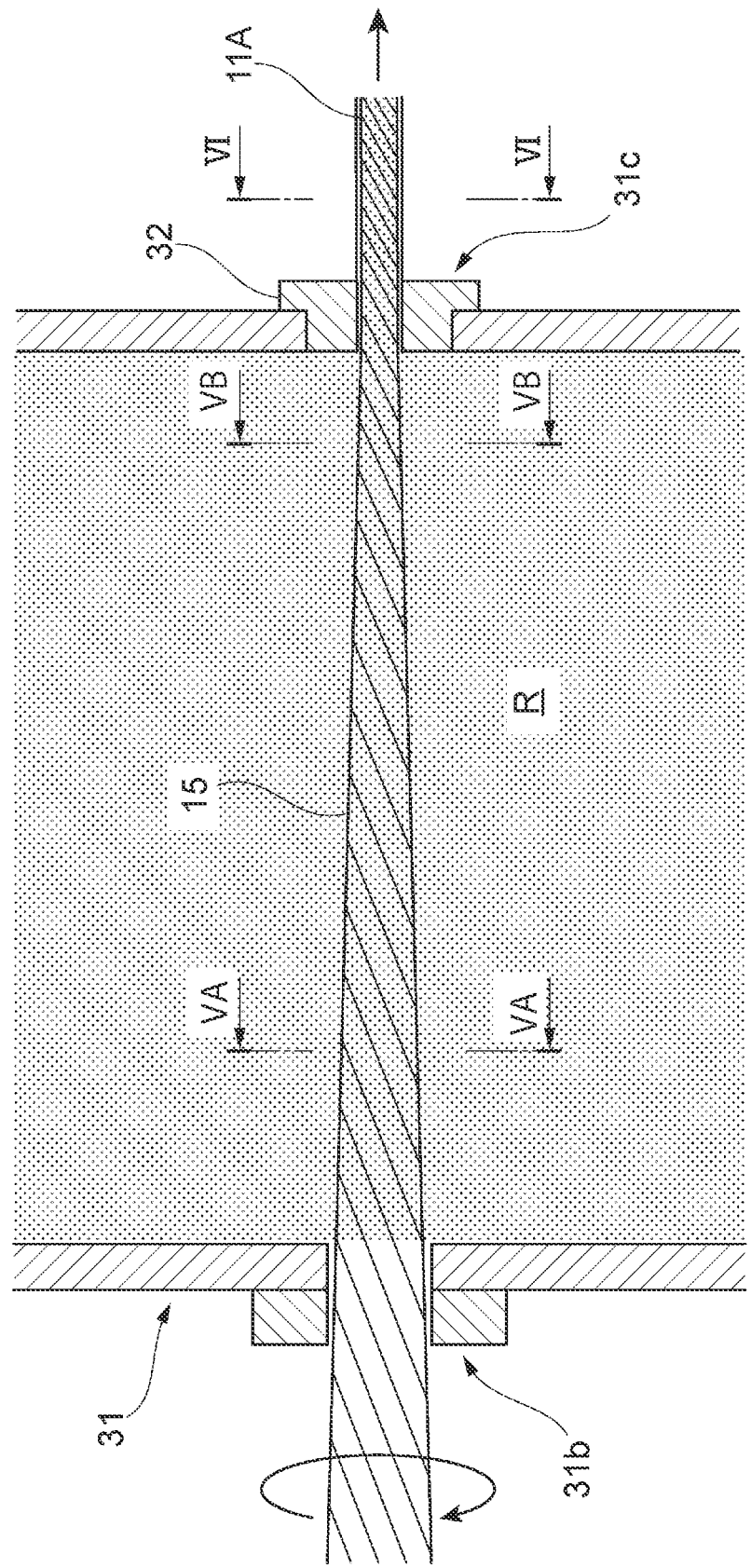
FIG. 4 is a diagram schematically illustrating a state of the fiber bundle passing through a resin bathtub.

FIG. 4 is a diagram schematically illustrating a state of the fiber bundle 15 passing through the resin bathtub 31.

The fiber bundle 15 is introduced into the resin bathtub 31 through the fiber bundle inlet 31b and is drawn out from an opening of a die 32 provided at the fiber bundle outlet 31c. The inner diameter of the opening of the die 32 is smaller than the inner diameter of the fiber bundle inlet 31b, the fiber bundle 15 is gradually drawn from the fiber bundle inlet 31b toward the fiber bundle outlet 31c, and the outer diameter of the fiber bundle gradually decreases. For example, in the case of the fiber bundle 15 having a flat cross section, the cross section is deformed into a small circle at the fiber bundle outlet 31c. In this way, the fiber bundle 15 is drawn until the fiber bundle 15 reaches the die 32, thereby forming a columnar shape. Then, an unhardened strand 11A formed by impregnating the inside of the fiber bundle 15 with the molten thermoplastic resin and covering the outer surface with the molten thermoplastic resin is drawn out from the opening of the die 32.

Figure 5A:
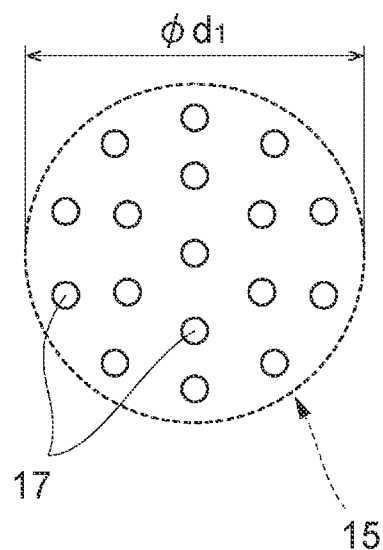
FIG. 5A is a cross-sectional view of the fiber bundle taken along a line VA-VA shown in FIG. 4.
Figure 5B:
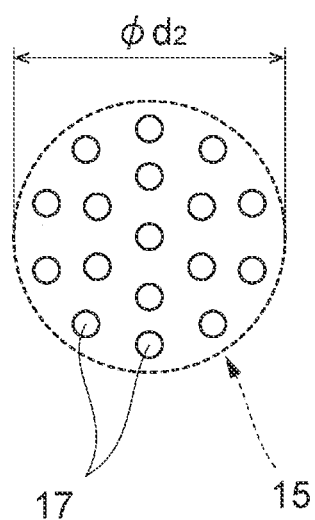
FIG. 5B is a cross-sectional view of the fiber bundle taken along a line VB-VB shown in FIG. 4.
Figure 6:
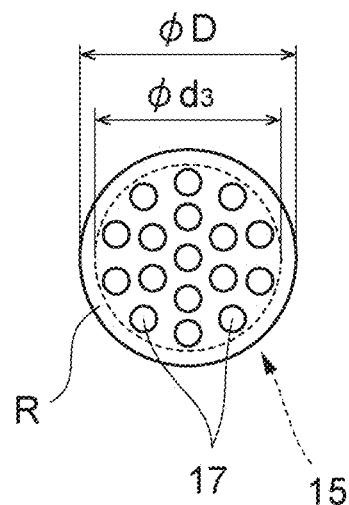
FIG. 6 is a cross-sectional view of an unhardened strand that has passed through a die, taken along a line VI-VI shown in FIG. 4.

FIG. 5A is a schematic cross-sectional view of the fiber bundle 15 taken along a line VA-VA shown in FIG. 4. FIG. 5B is a schematic cross-sectional view of the fiber bundle 15 taken along a line VB-VB shown in FIG. 4. FIG. 6 is a schematic cross-sectional view of the unhardened strand 11A that has passed through the die 32, taken along a line VI-VI shown in FIG. 4.

As shown in FIG. 5A, the reinforcing fibers 17 of the fiber bundle 15 are open on the upstream side in a conveying direction in the resin bathtub 31, and a gap between the reinforcing fibers 17 is widened. When the molten resin enters the gap between the reinforcing fibers 17, the fiber bundle 15 is efficiently impregnated with the molten resin. As shown in FIG. 5B, the outer diameter of the fiber bundle 15 is reduced to $\varphi d2$ from $\varphi d1$ in the case of FIG. 5A, and the gap between the reinforcing fibers 17 is narrowed. At this time, the fiber density of the reinforcing fibers 17 in a position closer to the center of the fiber bundle 15 is higher than that in a position closer to the outer surface of the fiber bundle 15. As described above, just before the die 32, the gap between the reinforcing fibers 17 is narrowed, but the gap between the reinforcing fibers 17 has already been impregnated with the molten resin, and no void remains even when the reinforcing fibers 17 are drawn.

As shown in FIG. 6, in the unhardened strand 11A that has passed through the die 32, the fiber bundle 15 is compressed in the opening of the die 32 to have a smaller outer diameter $\varphi d3$ ($\varphi d1 > \varphi d2 > \varphi d3$), and a layer of the thermoplastic resin R is formed on the outer periphery of the fiber bundle 15. When the fiber bundle 15 passes through the opening of the die 32, the thermoplastic resin R adhering to the outer periphery of the fiber bundle 15 is taken out by the die 32, and accordingly, the thermoplastic resin R evenly covers the periphery of the fiber bundle 15, and the fiber bundle 15 becomes an unexposed unhardened strand 11A. An outer diameter $\varphi D$ of the unhardened strand 11A is determined by the inner diameter of the opening of the die 32.

(Cooling Unit)

The unhardened strand 11A drawn from the resin bath unit 30 is sent to the cooling unit 40.

The cooling unit 40 includes a cooling tank 41 that is long along a drawing direction of the unhardened strand 11A drawn from the resin bath unit 30. Cooling water as a cooling medium is stored in the cooling tank 41. The unhardened strand 11A is drawn into the cooling tank 41 and cooled by the cooling water in the cooling tank 41. Accordingly, the thermoplastic resin is hardened to form the strand 11 containing the base material 13 in which the thermoplastic resin shown in FIG. 1 is solidified, and the fiber bundle 15 which is disposed in the base material 13 and has been twisted. In this way, in the cooling tank 41, it is preferable to cool the unhardened strand 11A while holding it linearly with a predetermined length in the drawing direction. The formed strand 11 is drawn out from the cooling tank 41.

(Winding Unit)

The strand 11 drawn moves toward the winding unit 50 shown in FIG. 2. The winding unit 50 includes a winding reel 51 for winding the strand 11. The winding reel 51 is rotated about an axis orthogonal to an extending direction of the strand 11. Accordingly, the winding reel 51 continuously winds the strand 11 drawn out from the cooling tank 41.

It is preferable that at least one of the support shafts 23a and 23b of the twisting unit 20 is connected to a twisting drive unit (not shown), and a winding shaft 53 of the winding reel 51 is connected to a winding drive unit (not shown), each of which is independently rotationally driven. The twisting drive unit and the winding drive unit may be, for example, a common motor drive mechanism or may be a manual one. The twisting drive unit and the winding drive unit function as a twist control unit that sets the number of twists in the twisted fiber bundle in accordance with a rotation speed of the reel 21 and a rotation speed of the winding reel 51.

Specifically, the twist control unit may include a rotation detection unit that detects rotation around the support shafts 23a and 23b of the reel 21, a speed detection unit that detects a linear speed of the strand 11 wound around the winding reel 51, the twisting drive unit, the winding drive unit, and a control unit such as a microcomputer that controls these units. The rotation detection unit detects a rotation speed (twist rotation speed) Va of the fiber bundle 15 due to the rotation around the support shafts 23a and 23b of the reel 21. The speed detection unit detects a winding speed (linear speed in the conveying direction) Vb of the strand 11 due to the rotation of the winding reel 51. As the rotation detection unit and the speed detection unit, a common sensor using an encoder or the like can be used.

When the speed ratio between the rotation speed Va and the winding speed Vb is Rv (=Vb/Va), the number of twists in the strand 11 can be arbitrarily set by adjusting the speed ratio Rv. For example, in a case where the winding speed Vb is constant, the larger the rotation speed Va is, the larger the number of twists per unit length is. In this way, the number of twists can be easily adjusted by the twist control unit.

<Strand Production Procedure and Strand Properties>

The strand production method using the strand production apparatus 100 having the above configuration generally includes the following steps.

(1) a step of rotating the fiber bundle 15 around an axis of the fiber bundle 15 to form a twisted fiber bundle 15.
(2) a step of impregnating the twisted fiber bundle 15 with a molten resin.
(3) a step of winding the fiber reinforced resin strand 11 impregnated with the molten resin.

Specifically, the fiber bundle 15 wound around the reel 21 of the twisting unit 20 is drawn out by the rotation drive of the winding reel 51, and the reel 21 is rotated around the support shafts 23a and 23b. Accordingly, a twist is imparted to the fiber bundle 15 drawn. The fiber bundle 15 twisted is immersed in the molten thermoplastic resin in the resin bathtub 31, whereby the fiber bundle 15 is impregnated with the thermoplastic resin. Then, the unhardened strand 11A obtained by drawing out the fiber bundle 15 impregnated with the thermoplastic resin from the resin bathtub 31 is cooled in the cooling tank 41, whereby the thermoplastic resin is hardened, and the fiber bundle 15 twisted is impregnated with the thermoplastic resin to obtain a strand 11 whose outer periphery is covered with the thermoplastic resin.

Since the strand 11 is impregnated with the thermoplastic resin after the fiber bundle 15 twisted is formed, and then the thermoplastic resin is hardened, kinking is unlikely to occur after the thermoplastic resin is hardened. That is, as compared with a case where a twist is imparted to the fiber bundle after the fiber bundle is impregnated with the thermoplastic resin, the residual stress in the strand 11 is small, so that the residual bending is prevented and a property such as high linearity can be obtained. Further, the outer surface of the base material 13 of the strand 11 is smooth, the formation of twist grooves due to twisting is prevented, and the roundness on the outer surface of the base material 13 is improved.

As a result, when the strand 11 is wound around the winding reel 51, the strand 11 does not break due to kinking, and smooth winding is possible. In addition, in the case where the strand 11 is continuously produced, the conveying speed for the strand 11 can be easily increased, which can contribute to the improvement in productivity. Further, the mechanism of the winding unit 50 can be configured by using a simple winding reel 51, and does not need to be complicated or large. The above effect can be obtained regardless of the diameter of the strand 11.

In the case where the produced strand 11 is used as an additive manufacturing material in, for example, a 3D printer, even when there is a portion where the strand conveying path in the 3D printer is bent with a small radius of curvature, the strand 11 has less bending and the roundness on the surface of the strand is high. Therefore, smooth feeding is possible, and a high-quality manufactured object can be stably produced.

The case where the strand 11 includes one fiber bundle 15 is described above, but the number of the fiber bundles 15 twisted is not limited to this.

Figure 7:
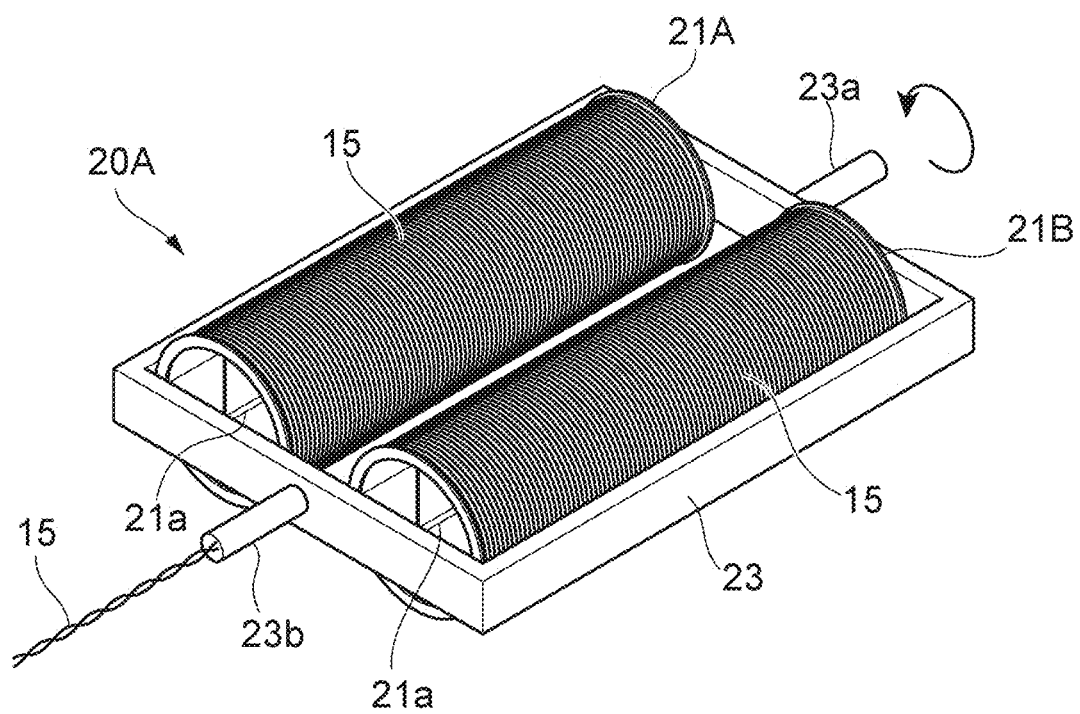
FIG. 7 is a schematic perspective view showing a configuration of a twisting unit for twisting a plurality of fiber bundles together.

FIG. 7 is a schematic perspective view showing a configuration of a twisting unit 20A for twisting a plurality of fiber bundles together.

In this twisting unit 20A, when a plurality of reels 21A and 21B around which the fiber bundles 15 are wound are rotatably disposed within the frame of the reel support 23, and the fiber bundles 15 are individually drawn out from each of the reels 21A and 21B, a strand obtained by twisting a plurality of fiber bundles 15 together can be produced.

The number of fiber bundles 15 twisted together can be arbitrarily set in accordance with the number of reels disposed within the frame of the reel support 23. In the case shown in FIG. 7, two fiber bundles 15 are twisted in a spiral shape, but for example, three fiber bundles 15 can be twisted from three reels.

Figure 8:
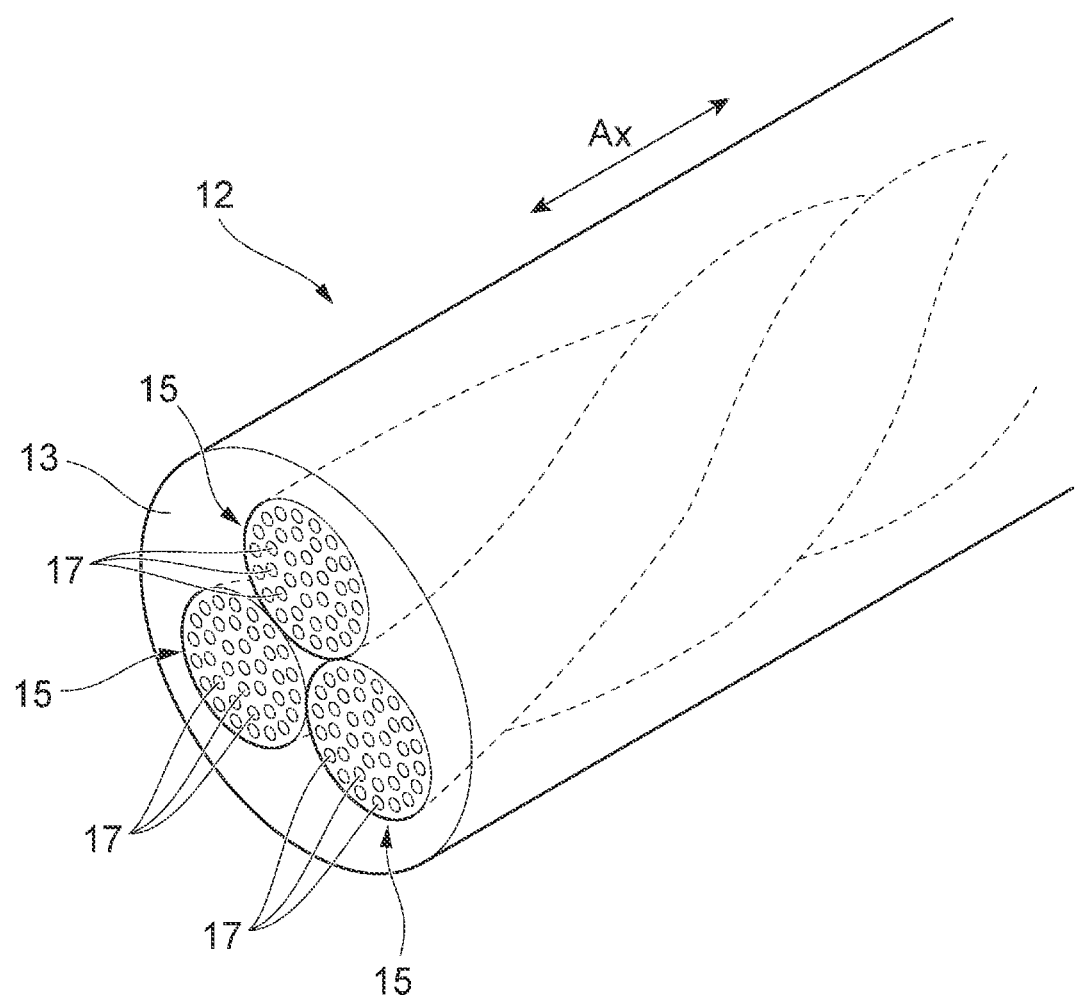
FIG. 8 is a schematic perspective view of a strand in which three fiber bundles are twisted together.

FIG. 8 is a schematic perspective view of a strand 12 in which three fiber bundles 15 are twisted together.

The strand 12 has three fiber bundles 15 spirally twisted along the axial direction Ax. Here, although not shown, the reinforcing fibers 17 in each fiber bundle 15 is in a state of being twisted along the axial direction Ax.

EXAMPLES

Test Example 1

UBE Nylon (registered trademark) 6 "1010X1" manufactured by UBE Corporation was used as the thermoplastic resin, and PYROFIL (registered trademark) TR30S 3L was used as a reinforcing fiber, a fiber reinforced resin strand having a fiber content of about 60 mass % and a cross-sectional diameter of 0.55 mm was produced using the strand production apparatus 100 shown in FIG. 2. The twist rotation to the reinforcing fiber was manually performed, and the number of twists per unit length was set to be about 100 times/m (reference set value) using a stopwatch.

The carbon fiber bundle twisted was allowed to pass through the resin bath unit and the cooling unit to form the strand, and the strand was wound around the winding reel with a roller rotating at a speed of 1 m/min. In the strand produced by the method in Test Example 1, neither rotation around a traveling direction of the strand, as the rotation shaft, nor the occurrence of kinking due to this rotation was observed, and winding was possible by simple rotation with the traveling direction of the strand as a tangential direction.

A sample was prepared by embedding the produced strand in a resin for embedding (epoxy resin or the like), and the cross section of the sample was polished to observe the cross section of the carbon fiber bundle. When the cross section of the sample was observed with a laser microscope, good resin impregnation for the carbon fiber bundle was confirmed. In addition, the roundness of the surface of the base material on which the thermoplastic resin was hardened was 0.957, and it was confirmed that a high roundness was obtained. Further, it was confirmed that the number of twists per unit length calculated based on the microscopic observation on the side surface of the strand was 114 times/m, which was very close to the reference set value, i.e., 100 times/m.

Test Example 2

Figure 9:
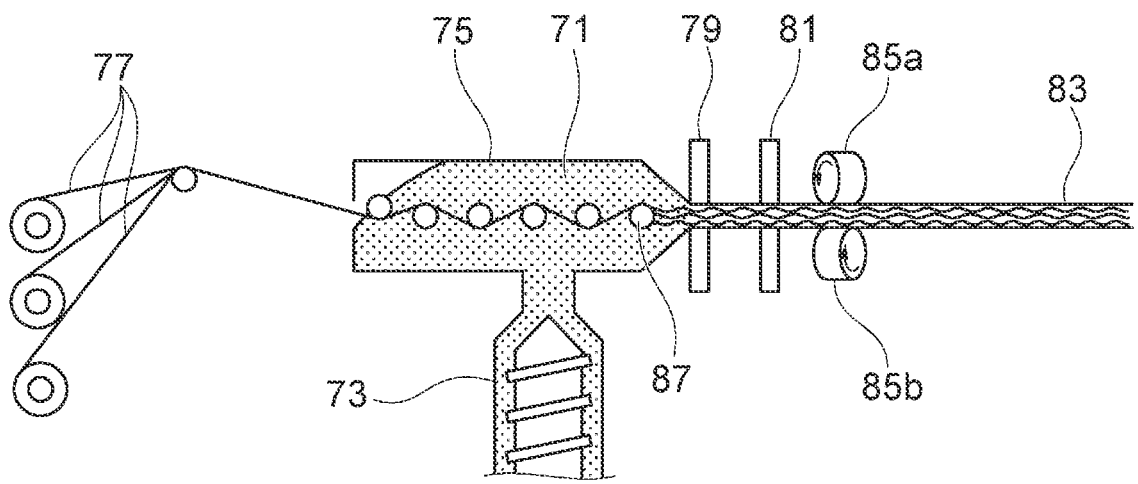
FIG. 9 is a schematic configuration diagram showing a mechanism of a strand production apparatus in the related art.
Figure 10:
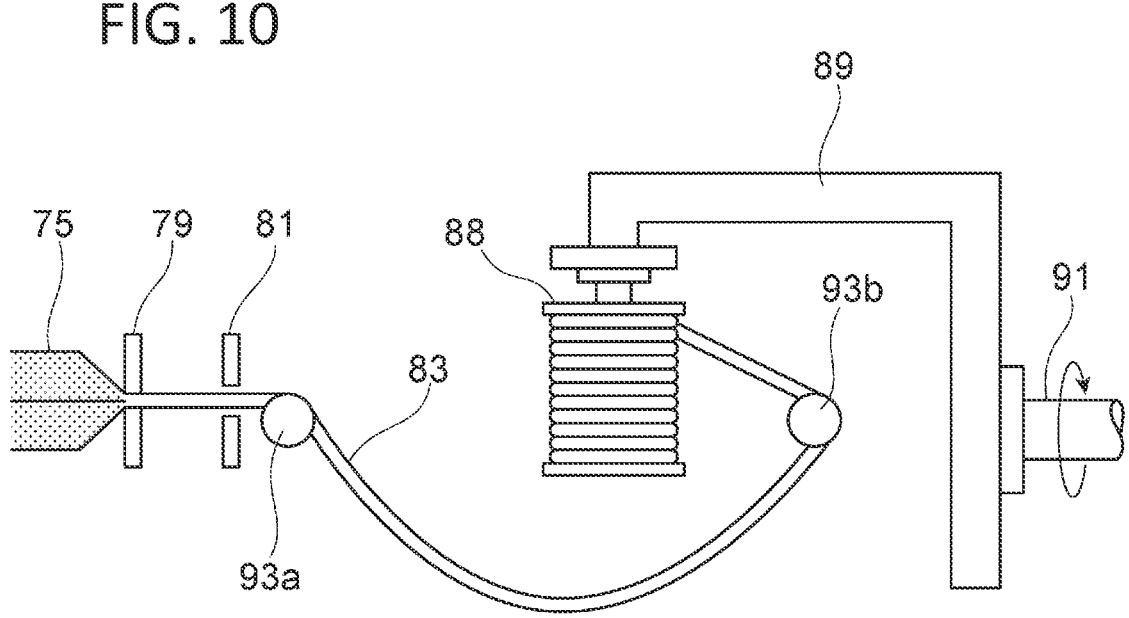
FIG. 10 is a schematic configuration diagram showing a mechanism of another strand production apparatus in the related art.

A carbon fiber reinforced resin strand was produced with the same materials, fiber content, and production conditions as in Test Example 1, except that a strand production apparatus shown in FIG. 9 was used, and two pairs of twist rollers, in which the rotation shaft was tilted at an angle of 10° from the conveying direction and by which the strand was rotated at a rotation speed, i.e., a conveying speed, of 1 m/min to 5 m/min, were used. As a result, regardless of the conveying speed for the strand, the strand produced by this method was rotated about the traveling direction as the rotation shaft, and kinking occurs due to this rotation. As a result of the observation on the cross section of the strand by a laser microscope, the resin impregnation property for the fiber bundle was good, but the number of twists per unit length calculated based on the microscopic observation on the side surface of the strand was 101 times/m. The roundness of the surface of the base material on which the thermoplastic resin was hardened was 0.887. Thus, in Test Example 2, the number of twists and the roundness were both slightly lower than those in Test Example 1.

From above, it was confirmed that the twisting mechanism in Test Example 1 did not cause kinking of the strand and contributed to the improvement in roundness of the surface of the base material of the strand. Table 1 summarizes the evaluation results for the strands obtained in Test Examples 1 and 2 above.

TABLE 1

|  | Fiber content [mass %] | Occurrence of kinking | Impregnation property | Roundness | Number of twists [times/m] |
| --- | --- | --- | --- | --- | --- |
| Test Example 1 | 62.1 | No | Good | 0.957 | 114 |
| Test Example 2 | 63.7 | Yes | Good | 0.887 | 101 |

As described above, the present invention is not limited to the above embodiment, and combinations of the respective configurations of the embodiment, or changes and applications made by those skilled in the art based on the description of the specification and common technology are also intended by the present invention and are included within the scope to be protected.

As described above, the present specification discloses the following matters.

(1) A strand production apparatus configured to produce a fiber reinforced resin strand having one or a plurality of fiber bundles including reinforcing fibers, the strand production apparatus comprising:
a twisting unit that rotates the one or the plurality of fiber bundles around an axis of the one or the plurality of fiber bundles to form one or a plurality of twisted fiber bundles:
a resin bath unit in which the one or the plurality of twisted fiber bundles are impregnated with a molten resin to form a fiber reinforced resin strand; and
a winding unit that winds the fiber reinforced resin strand, wherein the twisting unit is disposed on an upstream side of the resin bath unit in a conveying direction of the one or the plurality of fiber bundles.

(2) The strand production apparatus according to (1), wherein the winding unit continuously conveys the one or the plurality of fiber bundles in the conveying direction.

According to this strand production apparatus, a twist is imparted to the fiber bundle after the fiber bundle is impregnated with the molten resin, so that a fiber reinforced resin strand in which the occurrence of kinking is prevented can be obtained. Since the occurrence of kinking is prevented, the strand can be easily would with the winding unit, and it is possible to prevent the winding mechanism from becoming large and complicated. Accordingly, the productivity can be improved. Further, when the produced fiber reinforced resin strand is used for a 3D printer or the like, since there is no bending, the fiber reinforced resin strand can be smoothly fed.

(3) The strand production apparatus according to (1), wherein the twisting unit comprises:
a reel around which the one or the plurality of fiber bundles are wound;
a reel support that supports a rotation shaft of the reel and has a support shaft intersecting the rotation shaft; and
a support-shaft support that rotatably supports the support shaft of the reel support, and
the twisting unit is configured to form the one or the plurality of twisted fiber bundles by feeding the one or the plurality of fiber bundles from the reel toward the resin bath unit with the reel support rotating around the support shaft.

According to this strand production apparatus, the twisted fiber bundle can be easily formed by a simple operation of rotating the reel support.

(4) The strand production apparatus according to (3), further comprising: a twist control unit that sets the number of twists in the one or the plurality of twisted fiber bundles in accordance with a rotation speed of the reel around the support shaft and a winding speed for the fiber reinforced resin strand by the winding unit.

According to this strand production apparatus, by adjusting the rotation speed, the number of twists in the twisted fiber bundle can be easily adjusted, and a strand having a desired number of twists can be produced with high productivity.

(5) The strand production apparatus according to any one of (1) to (4), further comprising: a cooling unit that cools the fiber reinforced resin strand drawn out from the resin bath unit with the fiber reinforced resin strand held linearly along a drawing direction.

According to this strand production apparatus, the unhardened fiber reinforced resin strand impregnated with the molten resin is cooled while being held linearly, and the molten resin is hardened. Accordingly, the obtained fiber reinforced resin strand can have a property such as high linearity with controlled bending property.

(6) A strand production method for producing a fiber reinforced resin strand having one or a plurality of fiber bundles including reinforcing fibers, the strand production method comprising:

rotating the one or the plurality of fiber bundles around an axis of the one or the plurality of fiber bundles to form one or a plurality of twisted fiber bundles:

impregnating the one or the plurality of twisted fiber bundles with a molten resin to form a fiber reinforced resin strand; and winding the fiber reinforced resin strand.

(7) The strand production method according to (6), wherein winding the fiber reinforced resin strand includes continuously conveying the one or the plurality of fiber bundles.

According to this strand production method, after a twist is imparted to the fiber bundle, the fiber bundle is impregnated with the molten resin, so that a fiber reinforced resin strand in which the occurrence of kinking prevented can be obtained. Since the occurrence of kinking is prevented, the strand can be easily wound with the winding unit, and it is possible to prevent the winding mechanism from becoming large and complicated. Accordingly, the productivity can be improved. Further, when the produced fiber reinforced resin strand is used for a 3D printer or the like, since there is no bending, the fiber reinforced resin strand can be smoothly fed.

(8) The strand production method according to (6), wherein rotating the one or the plurality of fiber bundles includes feeding the one or the plurality of fiber bundles from a reel around which the one or the plurality of fiber bundles are wound while a reel support having a support shaft intersecting a rotation shaft of the reel is rotated around the support shaft, to form the one or the plurality of twisted fiber bundles.

According to this strand production method, the twisted fiber bundle can be formed by a simple operation of rotating the reel support.

(9) The strand production method according to (8), wherein the number of twists in the one or the plurality of twisted fiber bundles is set in accordance with a rotation speed of the reel and a rotation speed of winding the fiber reinforced resin strand.

According to this strand production method, by adjusting the rotation speed, the number of twists in the twisted fiber bundle can be easily adjusted, and a strand having a desired number of twists can be produced with high productivity.

(10) The strand production method according to any one of (6) to (9), wherein after the one or the plurality of twisted fiber bundles are impregnated with the molten resin, the fiber reinforced resin strand in which the one or the plurality of twisted fiber bundles are impregnated with the molten resin is cooled with the fiber reinforced resin strand held linearly.

According to this strand production method, the unhardened fiber reinforced resin strand impregnated with the molten resin is cooled while being held linearly, and the molten resin is hardened. Accordingly, the obtained fiber reinforced resin strand can have a property such as high linearity with controlled bending property.

(11) A fiber reinforced resin strand comprising one or a plurality of fiber bundles containing reinforcing fibers impregnated with a molten resin, wherein the one or the plurality of fiber bundles includes a twisted reinforcing fiber, and an amount of the twisted reinforcing fiber in a position closer to a center of the one or the plurality of fiber bundles is larger than that in a position closer to an outer surface of the one or the plurality of fiber bundles.

According to this fiber reinforced resin strand, the twisted reinforcing fibers are disposed such that an amount of the twisted reinforcing fibers in a position closer to the center of the fiber bundle is higher than that in a position closer to the outer surface of the fiber bundle. Accordingly, the reinforcing fibers are effectively impregnated with the molten resin, and the roundness of the surface of the strand is increased. As a result, the fiber reinforced resin strand can be smoothly fed, and a high-quality manufactured object can be stably produced.

11 Strand
13 Base material
15 Fiber bundle
17 Reinforcing fiber
20 Twisting unit
21 Reel
21a Reel rotation shaft
23 Reel support
23a, 23b Support shaft
25A, 25B Support-shaft support
30 Resin bath unit
31 Resin bathtub
31a Resin supply port
31b Fiber bundle inlet
31c Fiber bundle outlet
40 Cooling unit
41 Cooling tank
50 Winding unit
51 Winding reel
53 Winding shaft
100 Strand production apparatus

What is claimed is:

1. A strand production apparatus configured to produce a fiber reinforced resin strand having one or a plurality of fiber bundles including reinforcing fibers, the strand production apparatus comprising:

a twisting unit that rotates the one or the plurality of fiber bundles around an axis of the one or the plurality of fiber bundles to form one or a plurality of twisted fiber bundles;

a resin bath unit comprising a resin bathtub, the resin bathtub comprising a first sidewall, a second sidewall opposing the first sidewall, an inlet through the first sidewall, and an outlet die through the second sidewall, wherein the resin bathtub is configured to contain a molten resin to a level that covers the inlet through the first sidewall and the outlet die through the second sidewall, the inlet is configured to permit the one or the plurality of twisted fiber bundles to be drawn into the resin bathtub and through the molten resin, and the outlet die includes an opening configured to form a fiber reinforced resin strand from the one or the plurality of twisted fiber bundles impregnated with the molten resin and allow passage of the fiber reinforced resin strand outside the resin bathtub, and an inner diameter of the opening of the outlet die is smaller than an inner diameter of the inlet;

a cooling unit configured to cool the fiber reinforced resin strand drawn out from the resin bath unit with the fiber reinforced resin strand held linearly along a drawing direction; and a winding unit that winds the fiber reinforced resin strand, wherein the twisting unit is disposed on an upstream side of the resin bath unit in a conveying direction of the one or the plurality of fiber bundles.

2. The strand production apparatus according to claim 1, wherein the winding unit continuously conveys the one or the plurality of fiber bundles in the conveying direction.

3. The strand production apparatus according to claim 1, wherein the twisting unit comprises:

a reel around which the one or the plurality of fiber bundles are wound;

a reel support that supports a rotation shaft of the reel and has a support shaft intersecting the rotation shaft; and a support-shaft support that rotatably supports the support shaft of the reel support, and the twisting unit is configured to form the one or the plurality of twisted fiber bundles by feeding the one or the plurality of fiber bundles from the reel toward the resin bath unit with the reel support rotating around the support shaft.

4. The strand production apparatus according to claim 3, further comprising: a twist control unit that sets the number of twists in the one or the plurality of twisted fiber bundles in accordance with a rotation speed of the reel around the support shaft and a winding speed for the fiber reinforced resin strand by the winding unit.

* * * * *